May 25, 1971 C. A. A. MacPHEE ET AL 3,580,743
THERMOELECTRIC MODULE WITH DIAGONAL CONSTRUCTION
AND METHOD OF MANUFACTURING
Filed Jan. 7, 1966 3 Sheets-Sheet 1
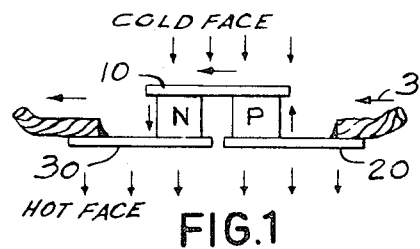
FIG.1
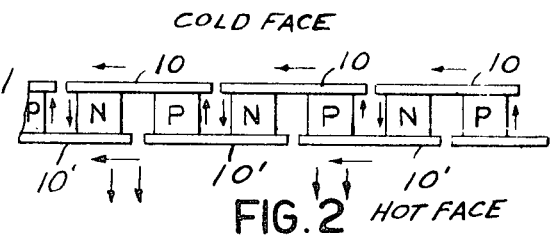
FIG.2
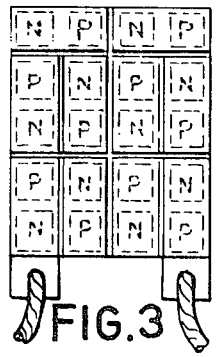
FIG.3
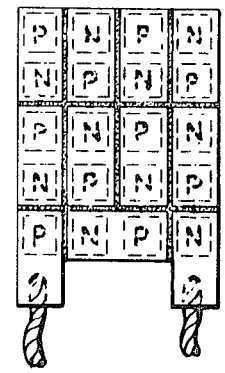
FIG.3a
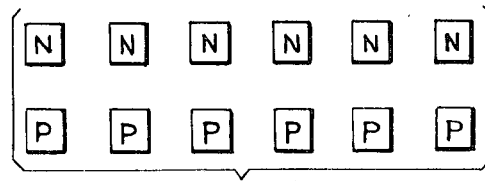
FIG.4
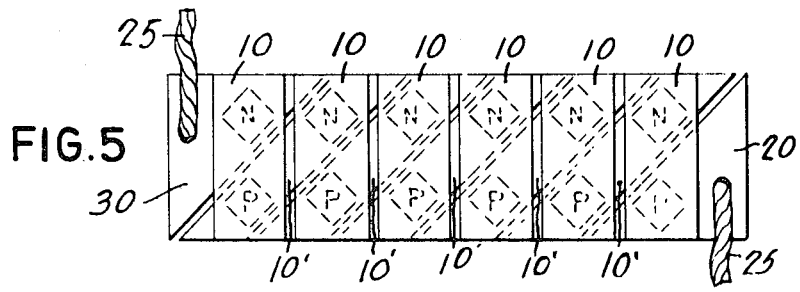
FIG.5
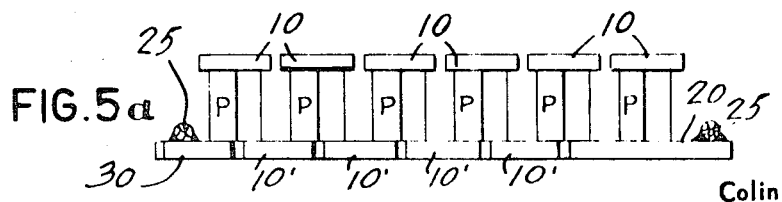
FIG.5a
INVENTOR
Colin A. A. MacPHEE
Antonio C. P. HAENE
ATTORNEY

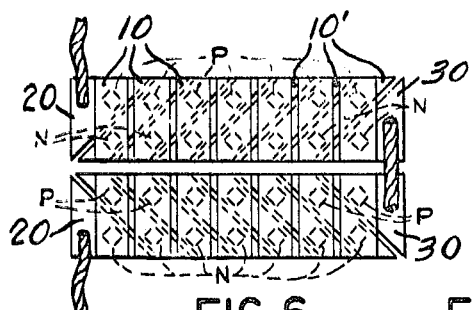
FIG.6
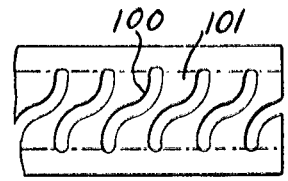
FIG.8
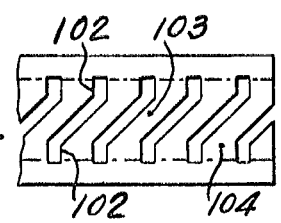
FIG.8a
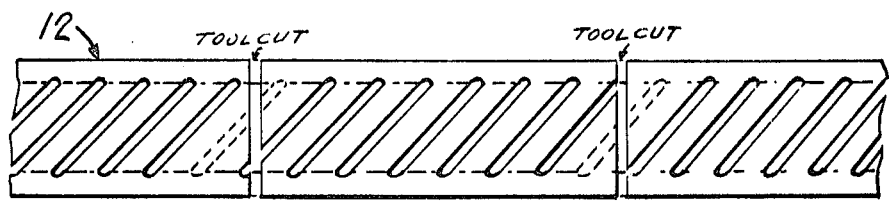
FIG.7
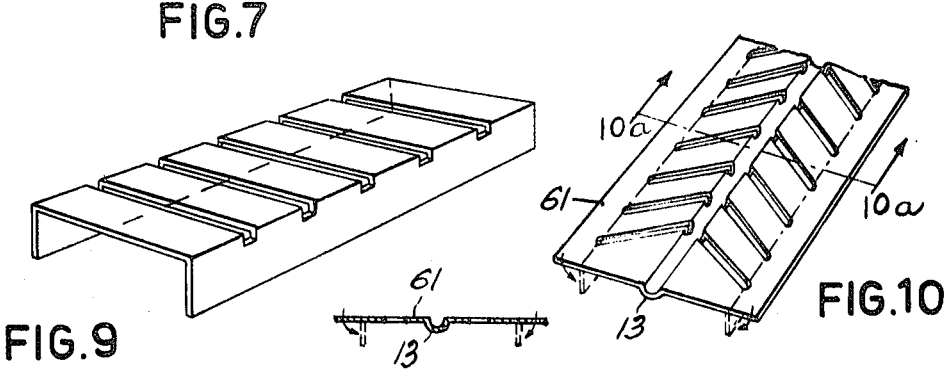
FIG.9
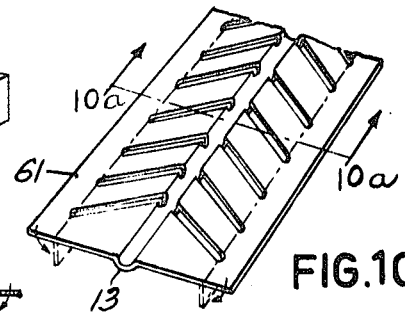
FIG.10
FIG.10a
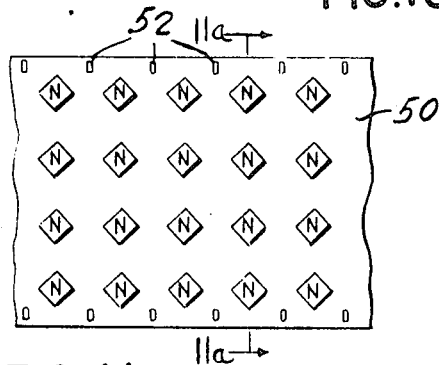
FIG.11
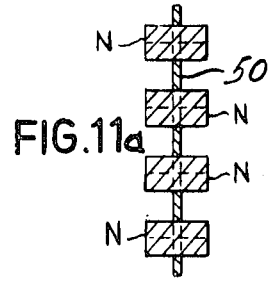
FIG.11a
INVENTOR
Colin A. A. MacPHEE
Antonio C. P. HAENE
ATTORNEY United States Patent Office 3,580,743
Patented May 25, 1971

3,580,743
THERMOELECTRIC MODULE WITH DIAGONAL CONSTRUCTION AND METHOD OF MANUFACTURING
Colin A. A. MacPhee, Beaurepaire, and Antonio C. P. Haene, Laval des Rapides, Quebec, Canada, assignors to Borg Warner Corporation, Chicago, Ill.
Filed Jan. 7, 1966, Ser. No. 519,363
Int. Cl. H01v 1/30
U.S. Cl. 136—212
31 Claims

ABSTRACT OF THE DISCLOSURE

A thermoelectric module construction comprising a first row of blocks made of semi-conductive P-type material and a second row of blocks made of semi-conductive N-type material parallel to the first row, with the blocks in the first row located directly opposite those in the second row. One end of each block in the first row is joined by a conductor to a corresponding end of a block directly opposite in the second row. An opposite end of each block in the first row is joined by a conductor to a corresponding opposite end of a block diagonally opposite in the second row.

---

The present invention relates to improvements in the manufacture of thermoelectric modules and more particularly to an improved form of thermoelectric module suited for mass production, and to a method for its manufacture.

The types of thermoelectric modules with which the invention is primarily concerned are those now becoming well known in various embodiments for the production of cooling effects and/or heating effects by the principles of thermoelectricity. As is known, the alloys of the bismuth-antimony-telluride type are the most effective available today for cooling applications, and these alloys are made up into P and N blocks which are suitably arranged in "couples" joined by copper connections or "bridges" with any required number of couples being interconnected to form "modules" of the required size. In such "modules" the P and N blocks are usually arranged in alternate sequence. The connecting bridges on one side of each module form the "cold" or cooling side and those on the opposite side form the "hot" or heat rejecting side.

If a series of "couples" is put together in a straight line, the resultant "module" assembly would be fragile and would require extremely careful handling. Therefore, it is usual to "fold" the interconnected "couples" into a more compact form by arranging them in the manner of an alternately folded strip following the current direction. Many expedients have been proposed for strengthening the modules, for example, polyurethane foam has been used to fill the interstices between the blocks to hold them together and add mechanical strength to the "module." It has also been proposed that the separate P and N blocks be assembled in a mold form and held together by casting resin or the like to surround the blocks, see U.S. Pat. 3,076,051 to Haba issued Jan. 29, 1963, for example. Another more preferable way of strengthening such a module is to bond the bridges on the one side of the module with, for example, a loaded epoxy resin having a thermal expansion co-efficient similar to that of copper. This method forms the subject of a co-pending application Ser. No. 507,805, filed on Nov. 15, 1965, and entitled Improvement in Thermoelectric Module Construction.

In any case, there are considerable difficulties encountered in mass producing "modules" of the type with which the invention is concerned, and as is well known, a major objective of mass production is to reduce costs to a minimum. To more clearly present some of the problems involved, a major labour cost is incurred in assembling the required P and N blocks and the connecting copper "bridges" in a suitable jig for the assembly soldering operation. A further major cost is incurred in handling the blocks for a tinning process which is essential. This latter process can be expedited to some degree by the use of suitable jigs and fixtures, but it is desirable that P type blocks be tinned separately from N type blocks, to minimize possible errors of assembly and possible contamination of P material with N and vice versa. This latter requirement implies excessive handling of blocks.

A further disadvantage of modules produced in single quantities is that they suffer from unrealiability, and duplication to a set specification is rendered very difficult.

Accordingly, the present invention is directed to a module design which allows of ready mass production, and as a result, has improved characteristics of reliability and repeatability to established specifications. The invention is also directed to the method of manufacture of the module which allows of mass production.

According to one aspect of the invention, there is provided a thermoelectric module comprising:

a plurality of blocks of semi-conductive material of the P and N types, each having two parallel planar faces and substantially identical dimensions perpendicular to said faces, bridges of electrically conductive material in strip form interconnecting the blocks in series in alternate sequence, wherein:

the blocks are situated in at least one pair of parallel rows with all said parallel faces aligned in two parallel planes, each row being composed of blocks of the same type, at least those blocks of one row other than the terminal blocks being situated perpendicularly opposite a corresponding block of opposite type in the other row, each bridge being bonded to substantially the whole area of two said parallel faces of blocks of opposite type, the bridges being arrayed in the said two parallel planes with the bridges of one array extending parallel and perpendicularly to the direction of the rows and each interconnecting every first block to a block perpendicularly opposite, and the bridges of the other said array extending in the same general direction across the direction of the first array and each interconnecting every said one block to a block diagonally opposite in such a manner as to complete said series circuit and to provide a path for current flow through the pair of rows of generally helical configuration.

In a preferred form of the invention, the sides of the blocks of said diagonally opposite bridged pairs run parallel to the sides of the bridges interconnecting such pairs, the latter bridges being straight and parallel and of narrower dimensions than the bridges of the opposite face of the module.

According to a second feature of the invention, there is provided a method of manufacturing thermoelectric modules having blocks of semi-conductive material of the P and N types electrically connected in series in alternate sequence by parallel co-planar arrays of bridges of electrically conductive material, comprising the steps of:

Forming the blocks with pairs of opposite parallel planar faces separated by identical distances, Arranging blocks of the P type in a first row, Arranging blocks of the N type in a second row parallel to the first, so that at least those blocks other than the terminal blocks of the rows are perpendicularly opposite one another and so that said planar faces of all the blocks are aligned in two parallel planes constituting the faces of the module, Arranging first strips of electrically conductive material in one said face plane so that each extends across two co-planar faces of a pair of perpendicularly opposite blocks so as to cover both faces, each strip being parallel to the next adjacent strip, Arranging second strips of electrically conductive material in the second said face plane so that each extends across two co-planar faces of a pair of blocks which are diagonally opposite one another so as to cover both faces, each second strip extending in the same general direction as the next adjacent strip, and Electrically and mechanically bonding each strip to the faces it covers and separating it from adjacent strips on each side in such a manner as to complete said series circuit and to provide a path for current flow through the pair of rows, of generally helical configuration.

Preferably, the said strips are formed and arranged by cutting a sheet of the bridge material to a width exceeding the lateral dimension of said pair of rows, slotting the sheet to provide the spaces between individual strips, each slot terminating short of the side edge of the sheet, arranging the slotted sheet over the aligned faces of the blocks so that the slots extend between the blocks and so that the strip formed between each pair of slots bridges two block faces to be interconnected, electrically and mechanically bonding the sheet to the aligned faces of the blocks, and removing the edge material of the sheet lying between the ends of the slots and the side edges of the sheet so as to leave the strips separate one from another.

The present invention presents the following advantages:

(a) The problems encountered in trying to design tools or equipment for mass production, based on known module design in which some bridges are placed at right angles to the rest, are altogether avoided.

(b) Since all the P blocks are in one row and all the N blocks in a separate row, not alternate as is done in the known designs, the two types of blocks may be kept separate up to and including placement in module assembly jigs, so avoiding mis-identification.

Thus, tooling for mass production becomes relatively simple and the possibilities of making reliable and economic thermoelectric modules are greatly improved.

Having thus generally described the nature of the invention, particular reference will be made to the accompanying drawings, showing by way of illustration, embodiments of prior art modules and preferred embodiments of the module design in accordance with the present invention in which:

FIG. 1 is a diagrammatic view in side elevation of a conventional thermoelectric couple;

FIG. 2 is a diagrammatic view in side elevation showing the basic circuit arrangement of a thermoelectric module;

FIGS. 3–3a are diagrammatic views in plan of the top and bottom bridge plan of a conventional module design;

FIG. 4 is a diagrammatic view in plan of the arrangement of P and N blocks in accordance with the invention;

FIG. 5 is a diagrammatic view in plan of one embodiment of module in accordance with the invention showing the diagonally opposite coupled blocks;

FIG. 5a is a side view of the module of FIG. 5;

FIG. 6 is a diagrammatic view of a combination of two 6 couple modules of FIG. 5 into a single 12 couple module, illustrating the aptitude of a module unit design according to the invention for mass production;

FIG. 7 is a view in plan of a bridge assembly blank illustrating one method of manufacture of the module of FIG. 5;

FIGS. 8 and 8a show alternative hot side bridge patterns as they may be produced from a copper sheet to serve as bridge connections for an alternative form of module in accordance with the invention;

FIG. 9 shows a perspective view of a typical bridge section as it may be formed for greater rigidity and flatness in preliminary assembly;

FIGS. 10 and 10a are views in perspective and cross-section respectively of an alternative form of blank for a bridge assembly suitable for a two section module;

FIGS. 11 and 11a show in plan and in section an arrangement of N blocks mounted on carrier tape for ease in handling for tinning and subsequent locating for module assembly;

Figure 13:
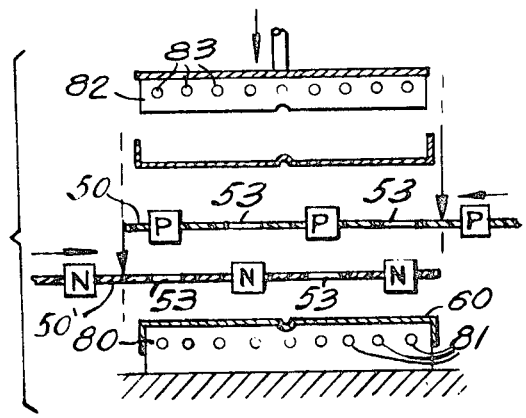
FIG. 13 is a view similar to that of FIG. 12 showing the assembly of a four row module.

With particular reference to FIGS. 1, 2 and 3 of the drawings, referring to the prior art and to further clarify the basic elements of the invention, a brief description of a thermoelectric couple and module will now be presented.

As is known, when two dissimilar metals are joined together, heat will be absorbed or given off at the junction between them if a direct current is passed from one metal to the other, though the junction. The effect in metals is small, but certain materials, e.g. bismuth telluride and its alloys, can be made in which the effect is intensified. If a properly proportioned device, called a "couple," is made with two such alloys, a usable amount of heat absorption can be produced. Such a couple is shown in FIG. 1 and consists of a block (P) of P type alloy and a block (N) of N type alloy, typically 6 x 6 x 5 mm. in size, joined together with a copper connector 10 called a "bridge" and with terminal connectors 20, 30 to form a continuous series electrical circuit. When a direct current (typically 30–35 amperes for the quoted block size) is passed through the couple in the direction shown by the arrow 31, the bridge 10 will, if it is properly insulated, be cooled to $-45°$ C., if the terminals 20 and 30 forming the opposite face of the couple are maintained at 30° C. as, for instance, by being cooled with water. Alternatively, such a device will, typically, pump 2–2.25 watts of heat (6.8 to 8.5 B.t.u./hr.) with zero temperature difference between the two faces.

As can be seen from FIG. 1, the heat is transported in the same direction in the two blocks whereas the electric current flows in opposite directions in the blocks. This, then is the reason for using a "P" type alloy and an "N" type alloy. In general, the alloys are of quite different compositions, and it is essential that one couple is made of one "P" block and one "N" block, not two of a kind.

Where more cooling than can be obtained from a given couple operating at a specified current is required, several couples may be joined in series electrically, as shown in FIG. 2. Such an arrangement is called a "module," and the total pumping capacity of such a module is equal to the pumping capacity of one couple multiplied by the number of couples in the module. As indicated by the arrows, the module retains a "hot face" and "a cold face," determined by the current path.

A series of couples, put together in a straight line, as in FIG. 2 above, forms a fragile assembly. To strengthen the assembly, or module, the strip of couples is conventionally folded into two, four, six, etc., depending on the size of the couples and the number of them in the modules. The usual method of folding produces cold face and hot face bridge patterns as shown in FIGS. 3 and 3a.

These designs are widely used, primarily because they are the most obvious ways of folding long strips of couples into compact form.

Modules of this type have been used almost exclusively, but they are difficult to mass produce for the reasons given above, namely:

(1) P and N type blocks alternate in all rows.
(2) One or both faces of the module must contain some bridges placed at right angles to the remainder.

In accordance with the present invention, all the P blocks are placed in one row and all the N blocks in a separate parallel row with N and P blocks arranged perpendicularly opposite as shown in FIG. 4.

In the design shown in FIG. 4, the blocks P, N are square and are arranged with two sides running parallel to the direction of the rows. It is apparent that the blocks may equally well be rectangular or circular or of any desired cross-section.

A more convenient and compact arrangement is shown in FIGS. 5 and 5a which also show the interconnection between the couples. All of the bridges 10 on one side, preferably the cold face, are arranged parallel to each other. To complete the series circuit, on the other face (preferably the hot face) each block is connected to an adjacent diagonally opposite block by bridges 10' which run generally diagonally across the direction of the bridges 10 of the cold face. The blocks are arranged with two sides running parallel to the direction of the diagonal bridges; i.e. the diagonally opposite blocks are arranged with their sides parallel. Terminal connectors 20, 30 are preferably provided on the hot face and are enlarged to take junction elements 25 for the leads.

The bridges are preferably of copper or other good heat and electric current conducting metal and are soldered to the end faces of the blocks. Preferably, the bridges have a coating between the copper and the solder of a metal selected from the group consisting of nickel, nickel phosphorus alloy, rhodium and gold as further set forth in co-pending U.S. application No. 252,826, filed Jan. 21, 1963.

A yet more compact arrangement may be obtained by using triangular cross-sectioned blocks, having one side flush with the side edges of the module and an apex pointing perpendicularly inwards. However, such blocks are more difficult to prepare, and the arrangement of FIG. 5 is preferred.

The arrangement of the bridges for interconnecting blocks as arranged in FIG. 4 is discussed hereafter with references to FIGS. 8 and 8a.

In every case, the end faces of the semiconductive blocks to which the bridges are soldered are parallel and aligned in two planes constituting the face planes of the module, and are separated by substantially identical block dimensions. However, the cross-sectional dimension of the N blocks may be different from that of the P blocks, depending on the characteristics of the semi-conductive material used in each case.

It will be apparent to those skilled in the art of mass production that this design lends itself admirably to mass production methods since it is endlessly repetitive and may be regarded as a sub-module which can be combined with similar sub-modules laterally, preferably by reversing the hot side bridge pattern as shown in FIG. 6, so that the triangular terminal connectors at each end are more conveniently placed. The sub-modules of FIG. 6 may be interconnected mechanically by synthetic resin extending across a common face of the combined module or by plastic strips punched to grip and hold together the blocks of adjacent rows of the separate sub-modules.

The new design confers the additional benefit that stocks of modules at the manufacturer's factory may be reduced to a minimum, since a wide variety of module sizes can be obtained by combining sub-modules after manufacture. If, for example, sub-modules comprising 4, 5 or 6 couples are stocked as standard items, in both the left hand and right hand forms, some of the possible combinations are given in Table 1 below.

TABLE 1.—SOME COMBINATIONS OF SUB-MODULES

| | No. of sub-modules per module | | | | | | |
|---|---|---|---|---|---|---|---|
| | 1 | 2 | 3 | 4 | 5 | 6 | 7 |
| | No. of blocks per module | | | | | | |
| No. of couples per sub-module: | | | | | | | |
| 4 | 4 | 8 | 12 | 16 | 20 | 24 | 28 |
| 5 | 5 | 10 | 15 | 20 | 25 | 30 | 35 |
| 6 | 6 | 12 | 18 | 24 | 30 | 36 | 42 |

METHOD OF MANUFACTURE

While the copper bridges may be separately cut and soldered, it is preferred to keep all of the bridges for at least the hot side of the module together until after the module has been assembled, so reducing the number of parts handled. It is also preferable to make the bridges for the cold side in a similar manner.

One way of achieving this is shown in FIG. 7. A long sheet 12 of copper, somewhat wider than the required hot side bridges, has diagonal slots punched in it to provide the separation spaces between one bridge and those adjacent to it. The slots extend beyond the required bridge width but do not cross the strip completely. Periodically, after the number of slots required in one bridge assembly have been punched, a slot is omitted (shown dotted in the figure) and the strip is cut at this point in a subsequent operation, as shown. The bridge assembly may be plated, tinned and then assembled into a module in this form. After assembly, the hot side of the module is preferably single side bonded with a synthetic resin as will be described, and the edges of the copper strip are removed by any suitable method, e.g. ganged milling cutters, to separate the bridges electrically, leaving the module width as shown by the dotted line. The module may then be finished by lapping or grinding, as required.

The bridges on the cold side are treated in the same way, producing a similar bridge assembly, the differences being that all of the slots are at right angles to the rows of blocks, and that wider strips can be used.

It will be apparent that, although a straight slot is always preferred, for each of tooling, since the pattern is repetitive, only a single punch is necessary to produce any required bridge assembly for the hot side (a separate one is required for the cold side) and, therefore, it may be of any desired shape, without complicating the tooling unduly. Some possible shapes are shown in FIGS. 8 and 8a, and these shapes will allow rectangular blocks to be arranged as in FIG. 4.

In FIG. 8, the bridges connecting diagonally opposite pairs of blocks have curved longitudinal edges 100 of generally S-shaped configuration, the end portions of such edges being substantially parallel and defining enlarged end areas 101 where the bridges cover the blocks.

FIG. 8a shows a bridge section in which the bridges connecting diagonally opposite pairs of blocks have longitudinal edges, each having end portions 102 perpendicular to the direction of the rows and extending the depth of the block faces covered by the bridges, and central diagonal portions defining a narrow tongue 103 in each bridge interconnecting the larger end areas 104 which cover the blocks.

The bridge assembly method represented by FIG. 7 is adequate for the stated purposes. However, by strengthening it, the module assembly may be made so flat that no finishing operations to establish limits of flatness, thickness and parallelism are required. To achieve this, the bridge assembly must be made more rigid. This can be done by bending the edges of the strip to a position at right angles to the plane of the strip, so forming a channel section of inherently greater rigidity than the flat strip. FIG. 9 shows this form as applied to bridges for interconnecting perpendicularly opposite blocks, i.e. cold face bridges in the preferred case.

The required bending or forming operation is easily carried out with standard machinery after the punching operation. Alternatively, the slots as shown in FIG. 9 may be cut with a gang saw after the sheet has been bent. After the soldering step, the limbs of the channel section are removed, e.g. by grinding to separate the bridges.

It is possible to make two or more modules simultaneously if, for instance, low current modules are being made. It will be appreciated from FIG. 6 that a slot parallel to the long axis of the strip is required to separate the two sets of bridges. This can be achieved by limiting the slot lengths and by displacing by indentation the metal forming the uncut remainder of the slot from the plane of the strip. The basic pattern is shown in FIGS. 10, 10a. The indentation 13 in the centre separates the bridges of one sub-module from the bridges of the adjacent sub-module (compare FIG. 6). The metal remaining where all of the slots converge is depressed at 13. The preferred folding of the sides of the strip, depicted in FIG. 9, is shown in dotted lines. The depressed metal serves to hold together the two halves of the pattern, and it is removed by the same operation which removes the edges, e.g. by lapping or grinding, the blocks being soldered on the surface opposite to the direction of displacement to facilitate this operation.

To utilize this invention to its fullest capacity, arrays or assemblies of blocks are produced so that one contains only P blocks, the other only N.

For this purpose, the blocks may be held in grip-tight apertures punched in a carrier tape. Such tape may be of any suitable semi-flexible material such as paper, treated fabric or plastics material. It may, for example, resemble a cinematograph film. FIG. 11 shows such a carrier tape 50 carrying N type blocks in grip-tight apertures. A similar tape is made in which P blocks are assembled. The carrier tapes 50 are used to hold and convey the blocks during the tinning process, which may be any convenient process such as dip tinning, and to position them during the module assembly soldering. The elongated holes 52 shown at the edges of the tape are used for positioning blocks during the assembly operation.

When a multiple module, as depicted in FIG. 6 is to be made, the assembly is modified slightly in that each alternate row of holes 53 (FIG. 13) across the tape 50 is left empty. The holes 53 are clearance holes and may be made larger than the grip-tight holes carrying the blocks. The holes 53 allow clearance of the blocks of the opposite type during positioning for the module assembly operation; if the positioning is sufficiently precise, all the holes may be the same size, thus avoiding the necessity for punching different sizes of holes.

Figure 12:
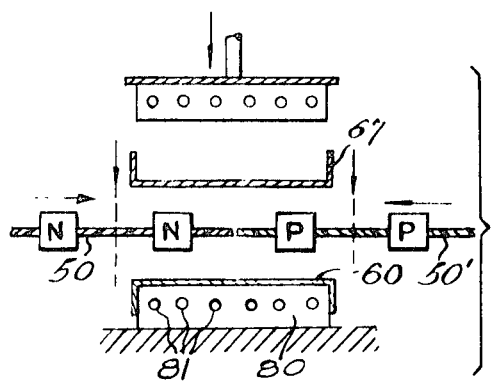
FIG. 12 is an end view of semi-conductor block and bridge sections for a double row module, in position prior to soldering.

FIG. 12 shows the module assembly process for a two row module. For clarity, the spacing members and the drive mechanisms have been omitted.

In operation, a cut and slotted hot side bridge section 60 is slid end-wise into position along a lower anvil 80, heated by any suitable means, for example, by passing a heated fluid through passages 81. One carrier tape 50 carrying tinned N blocks is fed in from the left hand side as viewed in FIG. 12 until the end row of blocks is positioned over the section 60 in register over their positions between the slots. A second carrier tape 50' carrying N blocks is fed in from the opposite side in the same way. The bridge section 67 for the cold face of the module is slid into the registration position along an upper anvil 82 heated by fluid in passages 83. The upper anvil 82 is then moved downwards to clamp the assembly of sections and blocks together, and fluid is applied to the anvils to effect soldering. Spacers may be used to limit the downward movement of the upper anvil and to ensure that the correct positioning of the assembly is obtained before soldering. It is apparent that heat may be applied in other ways, e.g. by radiation. The assembly is allowed to cool. The carrier tapes 50 are cut along the dotted lines between the row of blocks soldered into the assembly and the next row, so releasing the assembly. The whole procedure is then repeated.

When a double module is to be assembled, the procedure is slightly different, as shown in FIG. 13.

In this case, the P blocks and N blocks are fed into the apparatus at different levels until the P blocks register with the clearance holes in the N carrier tape and vice versa, and both sets of blocks are properly registered with respect to the two bridge assemblies. Otherwise, the procedure is the same as for single module assembly.

This same method can be used for other multiple module assemblies also.

As previously described above, the preferred method of strengthening the module assemblies to withstand handling and mechanical shocks is the bonding together of the bridges on one side (preferably the hot side for normal applications) with a suitable material, such as a loaded epoxy resin, having approximately the same expansion co-efficient as the copper bridges. This operation is further described in co-pending application Ser. No. 507,805, filed on Nov. 15, 1965, and entitled Improvement in Thermoelectric Module Construction.

Figure 14:
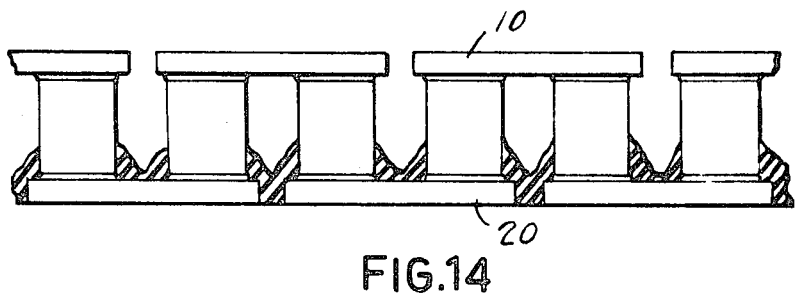
FIG. 14 is a section through a module bonded on one face with a synthetic resin.

The bonding operation is carried out after the assembly soldering operation has been completed, using any convenient means, such as dipping the face to be bonded in a bath of uncured resin to pick up the required amount and then curing the resin, to produce a module as shown in longitudinal section in FIG. 14. As shown in FIG. 14, the resin extends in depth along the blocks for part of the distance towards the opposite face of the module. In the case of multiple modules, the resin may be used to hold the two sub-modules side by side and to fill the space previously taken up by the displaced indentation after the displaced metal has been ground away. If the indentation is deep enough, the face of the module may be dipped in the resin before the displaced metal is ground away, i.e. the resin fills the slot in the displaced metal, and after grinding, retains its form to hold the two sub-modules side by side.

The resin used for the bonding operation should be cured at a temperature at least equal to the highest at which the module is intended to be operated, for reasons of stability.

The finishing operations consist of the removal of the sides of the channel shaped bridge sections and (if desired) the lapping or grinding of the faces of the module to obtain thickness, flatness and parallelism as required. When double or multiple modules are made, a lapping or grinding operation is a necessity to remove the projections which hold the sections of the module together before or after single side bonding, and it is desirable that all modules are finished by lapping or grinding for the sake of appearance.

The sides of the channel section may be removed conveniently by using ganged saws and a suitable holding jig (not shown). If, subsequent to this operation, the faces of the module are lapped, the burrs raised by the sawing operation will be removed. If lapping or grinding is not used, the burrs may be removed by means of a wire brushing operation.

On completion, the modules are then ready for lead attachment. The attachment of the leads to the completed modules may be achieved by the usual method of soldering although the applicant prefers to use a mechanical means of attachment as illustrated in FIG. 15.

There is a danger, if soldering is employed, of disturbing the joint between the terminal connector and the block to which it is soldered. The applicant's preferred method is to use expanding rivets, commonly called "pop" rivets.

Figure 15:
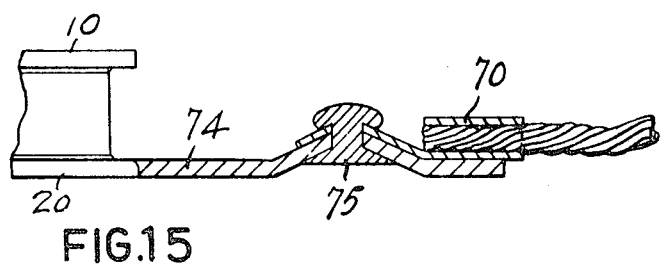
FIG. 15 shows one means of attachment of the necessary leads to the terminal diagonal bridge of a module made in accordance with the invention.

In this method, the lead is crimped into a terminal 70 and the terminal 70 is riveted to the lead bridge 74, as shown in the cross-sectional vew of FIG. 15. For this the lead bridge 74 must have a hole 75 punched in it and so that the hot side remains flat the hole 75 must be countersunk.

We claim:

1. A thermoelectric module comprising:
a plurality of blocks of semi-conductive material of the P and N types, each having two parallel planar faces and substantially identical dimensions perpendicular to said faces,
bridges of electrically conductive material in strip form interconnecting the blocks in series in alternate sequence, wherein:
the blocks are situated in at least one pair of parallel rows with all said parallel faces aligned in two parallel planes, each parallel row being composed of blocks of the same type, the blocks of one parallel row being situated perpendicularly opposite a corresponding block of opposite type in the other parallel row, each bridge being bonded to substantially the whole area of two said parallel faces of blocks of opposite type, the bridges being arrayed in the said two parallel planes with the bridges of one array extending parallel and perpendicularly to the direction of the parallel rows and each interconnecting every first block to a block perpendicularly opposite, and the bridges of the other said array extending in the same general direction across the direction of the first array and each interconnecting every said one block to a block diagonally opposite in such a manner as to complete said series circuit and to provide a path for current flow through the pair of parallel rows of generally helical configuration.

2. A module as claimed in claim 1 wherein the blocks are of constant rectangular cross-section, blocks of the same type having the same cross-sectional dimension.

3. A module as claimed in claim 1 wherein the blocks are triangular, one side of all the blocks lying flush with the ends of the bridges.

4. A module as claimed in claim 2 wherein sides of the blocks are parallel to the rows, the outer sides of the blocks being flush with the ends of the bridges.

5. A module as claimed in claim 4 wherein the bridges connecting diagonally opposite pairs of blocks have curved longitudinal edges of generally S-shaped configuration, the end portions of such edges being substantially parallel and defining enlarged end areas where the bridges cover the blocks.

6. A module as claimed in claim 4 wherein the bridges connecting diagonally opposite pairs of blocks have longitudinal edges each having end portions perpendicular to the direction of the rows and extending the depth of the block faces covered by the bridges, and central diagonal portions defining a narrow tongue in each bridge interconnecting the larger end areas which cover the blocks.

7. A module as claimed in claim 4 wherein the bridges are of copper and are soldered to the block faces.

8. A module as claimed in claim 7 wherein the spaces between the bridges on one face are interbonded by a thermosetting synthetic resin.

9. A module as claimed in claim 8 wherein two pairs of rows are situated side by side, each pair constituting a sub-module, the sub-modules being mechanically interconnected side by side and electrically connected in series.

10. A module as claimed in claim 2 wherein sides of the blocks of said diagonally opposite bridged pairs run parallel to the sides of the bridges interconnecting such pairs, the latter bridges being straight and parallel and of narrower dimensions than the bridges of the opposite face of the module.

11. A module as claimed in claim 10 wherein the bridges are of copper and are soldered to the block faces.

12. A module as claimed in claim 11 wherein the spaces between the bridges on one face are interbonded by a thermosetting synthetic resin extending in depth along the blocks for part of the distance towards the opposite face of the module.

13. A module as claimed in claim 12 wherein two pairs of rows are situated side by side, each pair constituting a sub-module, the sub-modules interbonded at one common face by the said resin, the latter forming an electrically insulating bridge.

14. A module as claimed in claim 12 wherein the diagonally arrayed bridges of one sub-module run at an angle to the direction of the corresponding bridges of the other sub-module.

15. A module as claimed in claim 10 wherein the copper bridges have a coating between the copper and the solder of a material selected from the group consisting of nickel, nickel phosphorus alloy, rhodium and gold.

16. A module as claimed in claim 2 wherein the terminal bridges interconnecting diagonally opposite pairs of blocks are enlarged to form platforms for electrical connections to the module.

17. A multiple module comprising a plurality of modules as claimed in claim 10 arranged side by side with corresponding faces co-planar, the modules being electrically connected in series, and the diagonally arranged bridges of alternate modules running in opposite diagonal directions.

18. A method of manufacturing thermoelectric modules having blocks of semi-conductive material of the P and N types electrically connected in series in alternate sequence by parallel co-planar arrays of bridges of electrically conductive material, comprising the steps of:
forming the blocks with pairs of opposite parallel planar faces separated by identical distances,
arranging blocks of the P type in a first row,
arranging blocks of the N type in a second row parallel to the first, so that the blocks of the rows are perpendicularly opposite one another and so that said planar faces of all the bocks are aligned in two parallel planes constituting the faces of the module,
arranging first strips of electrically conductive material in one said face plane so that each extends across two co-planar faces of a pair of perpendicularly opposite blocks so as to cover both faces, each strip being parallel to the next adjacent strip,
arranging second strips of electrically conductive material in the second said face plane so that each extends across two co-planar faces of a pair of blocks which are diagonally opposite one another so as to cover both faces, each second strip extending in the same general direction as the next adjacent strip, and
electrically and mechanically bonding each strip to the faces it covers and separating it from adjacent bridges on each side in such a manner as to complete said series circuit and to provide a path for current flow through the pair of rows, of generally helical configuration.

19. A method as claimed in claim 18 wherein the said strips are formed and arranged by cutting a sheet of the bridge material to a width exceeding the lateral dimension of said pair of rows, slotting the sheet to provide the spaces between individual strips, each slot terminating short of the side edge of the sheet, arranging the slotted sheet over the aligned faces of the blocks so that the slots extend between the blocks and so that the strip formed between each pair of slots bridges two block faces to be interconnected, electrically and mechanically bonding the sheet to the aligned faces of the blocks, and removing the edge material of the sheet lying between the ends of the slots and the side edges of the sheet so as to leave the strips separate one from another.

20. A method as claimed in claim 17 wherein the strips are of copper and wherein the sheet is coated with a material selected from the group consisting of nickel, nickel phosphorus alloy, rhodium and gold and thereafter tinned and soldered to the aligned faces of the blocks.

21. A method as claimed in claim 20 wherein after the sheets are soldered in place, one face of the module is dipped into a thermosetting synthetic resin composition sufficiently to allow the resin to fill the spaces between the strips and to extend in depth along the blocks for part of the distance towards the opposite face of the module and thereafter the face is removed and the resin caused to harden.

22. A method as claimed in claim 19 wherein after the sheet is cut to the said width, side edge portions of the sheet are bent substantially at right angles to form a channel shaped section of greater rigidity than the flat sheet, the surface of the web of the section opposite to the limbs being bonded to the block faces, the slots being formed to extend the width of the web, and wherein, after bonding, the limbs of the web are removed.

23. A method as claimed in claim 22 wherein the sheet is slotted before being bent to channel shaped section.

24. A method as claimed in claim 22 wherein the slots are sawn across the web of the channel shaped sections after the latter has been bent to shape.

25. A method as claimed in claim 23 wherein the strips are of copper and wherein the sheet is coated with a material selected from the group consisting of nickel, nickel phosphorus alloy, rhodium and gold and thereafter tinned and soldered to the aligned faces of the blocks.

26. A method as claimed in claim 25 wherein after the sheets are soldered in place, one face of the module is dipped into a thermosetting synthetic resin composition sufficiently to allow the resin to fill the spaces between the strips and to extend in depth along the blocks for part of the distance towards the opposite face of the module and thereafter the face is removed and the resin caused to harden.

27. A method as claimed in claim 19 wherein the P type blocks are inserted and held in tight fitting apertures punched in and extending in rows across the width of a first carrier tape, wherein the N type blocks are similarly assembled in a second carrier tape, wherein the tapes are conveyed in opposite directions into an assembly position in which the front rows of each sheet are disposed in positions corresponding to their end positions in the module, wherein the two slotted sheets are brought into alignment with the blocks in the said assembly position, the bonding faces of the blocks and sheets being tinned, and with the bridge portions of the sections in registration with the blocks to be connected thereby, the sections being then pressed together, sandwiching the blocks therebetween, heat being applied to the sections to cause them to solder to the block faces.

28. A method as claimed in claim 27 wherein the carrier tapes with their respective held blocks are conveyed to a dip-tinning station before arrival at said superimposed position.

29. A method as claimed in claim 18 wherein at least two rows of slots are formed in each sheet, the slots being parallel and nearly meeting at central regions of the sheets, and wherein the sheets are indented in the said central regions along the line where the slots of one row are adjacent the slots of the next row, the sheet being thereafter bonded to a corresponding plurality of pairs of rows of P and N type blocks with the indention directed away from the blocks so that the strips between the slots of one slot row form the bridges of one sub-module and the strips between the slots of the next adjacent slot row form the bridges of a second sub-module lying adjacent the first sub-module, and wherein after bonding, the said indentation is ground out so as to separate the sub-modules.

30. A method as claimed in claim 29 wherein before the said indentation is ground out one common face of the combined module is dipped into a thermosetting synthetic resin composition sufficiently to allow the resin to fill the spaces between the strips and to extend in depth along the blocks for part of the distance towards the opposite face of the module and thereafter the face is removed and the resin caused to harden.

31. A method as claimed in claim 29 wherein the P type blocks are inserted and held in tight fitting apertures punched in and extending in rows across the width of a first carrier tape, said tape being additionally punched with alternate rows of apertures for the N type blocks, wherein the N type blocks are similarly assembled in a second carrier tape having alternate rows of apertures for the P type blocks, wherein the carrier tapes with their assembled blocks conveyed in opposed directions step-wise to superimposed positions in which the end row of blocks held by each one tape is aligned with the unfilled apertures of the other tape, wherein the two slotted sheets are brought into alignment with the blocks in the said superimposed position, the bonding faces of the blocks and sheets being tinned, and the sheets are pressed together sandwiching the blocks therebetween, heat being applied to the sheets to cause them to solder to the block faces.

References Cited

UNITED STATES PATENTS 3,074,242   1/1963   Lindenblad _____ 136—203

C. F LEFEVOUR, Primary Examiner

W. A. DOUGLAS, Assistant Examiner